United States Patent [19]
Reynolds et al.

[11] 3,973,401
[45] Aug. 10, 1976

[54] POWER-OPERATED BOOSTERS FOR VEHICLE BRAKING SYSTEMS

[75] Inventors: Desmond Henry James Reynolds, Sutton Coldfield; Alfred Yardley, Blakedown, both of England

[73] Assignee: Girling Limited, Birmingham, England

[22] Filed: Jan. 30, 1975

[21] Appl. No.: 545,348

[30] Foreign Application Priority Data
Jan. 30, 1974 United Kingdom............... 4302/74
May 21, 1974 United Kingdom............. 22514/74

[52] U.S. Cl. ............................... 60/548; 91/378; 60/565
[51] Int. Cl.² ......................................... F15B 7/00
[58] Field of Search ........... 60/548, 582, 565, 566; 91/378, 391, 422, 391 R; 251/31

[56] References Cited
UNITED STATES PATENTS

| | | |
|---|---|---|
| 2,690,714 | 10/1954 | Lapsley............................ 91/378 X |
| 2,908,137 | 10/1959 | Spalding et al. ................. 91/378 X |
| 2,932,947 | 4/1960 | Kendig.............................. 60/565 X |
| 3,313,213 | 4/1967 | Wandel............................. 91/422 X |
| 3,357,310 | 12/1967 | Rohde.................................... 91/6 |
| 3,488,957 | 1/1970 | Snitgen................................ 60/565 |
| 3,696,615 | 10/1972 | Grabill, Jr. et al................ 91/391 R |
| 3,699,680 | 10/1972 | Shellhause........................ 60/548 X |

Primary Examiner—Martin P. Schwadron
Assistant Examiner—H. Burks, Sr.
Attorney, Agent, or Firm—Scrivener Parker Scrivener and Clarke

[57] ABSTRACT

In a power-operated hydraulic booster for a vehicle braking system pressurization of a power chamber in a housing on one side of a boost piston is controlled by an assembly of at least two separate spool parts which work in bores in the boost piston and the housing, and a boost chamber is defined in the housing between the power chamber and an output piston having an effective area less than that of the boost piston.

14 Claims, 5 Drawing Figures

POWER-OPERATED BOOSTERS FOR VEHICLE BRAKING SYSTEMS

This invention relates to power-operated hydraulic boosters for vehicle braking systems of the kind in which a boost piston works in a bore in a housing provided with an inlet port for connection to a source of hydraulic fluid under pressure and an outlet port for connection to a reservoir for fluid, and the ports communicate through valve means with a power chamber in the housing on one side of the boost piston, the valve means being so constructed and arranged that when the booster is operated in response to an input force hydraulic fluid from the inlet pressurises the power chamber to advance the boost piston in the housing thereby augmenting the input force.

In boosters of the kind set forth in which the valve means comprises a valve spool working in complementary bores in the boost piston and in an adjacent end of the housing difficulty may be experienced in maintaining the concentricity of the parts with the result that the efficiency of operation of the valve means, and in some cases the booster itself, is affected.

According to one feature of our invention, in a power-operated hydraulic booster of the kind set forth for a vehicle braking system the valve means comprises a spool working in complementary bores in the boost piston and an adjacent end of the housing, and the spool comprises an assembly of at least two separate spool parts which are in sealed abutment at adjacent ends, one spool part working in the bore in the boost piston and the other spool part working in the bore in the housing.

By constructing the valve spool from separate spool parts has the advantage that the parts can be relatively displaced radially to compensate for tolerance variations otherwise affecting the concentricity of the bore in which they work.

Conveniently the end of one spool part is received within a recess in the adjacent end of the other spool part and the diameter of the recess is greater than that of the said one spool part. In such a construction a seal is provided between interengaging faces of the spool part ends by an annular seal located in one of the parts.

When the booster is of the "closed-centre" type in which the valve means normally cut-off communication between the power chamber and the inlet port and provide communication between the power chamber and the outlet port, when the booster is operated in response to an input force, the valve spool is operative initially to cut-off communication between the power chamber and the outlet port and subsequently to place the power chamber in open communication with the inlet port so that hydraulic fluid under pressure is admitted to and pressurises the power chamber.

When the booster is of the "open-centre" type in which hydraulic fluid is normally circulated continuously between the inlet and outlet ports through communicating passages in the boost piston and the valve spool and through the power chamber, when the booster is operated the valve spool is operative to cut-off communication between the power chamber and the outlet port so that pressure from the inlet port can build up in and pressurise the power chamber.

According to a further feature of our invention in a power-operated hydraulic booster of the kind set forth the valve means also controls communication between the power chamber and a booster chamber defined in the bore between the opposite side of the boost piston and an output member comprising a piston of which the effective area is less than that of the boost piston, the chambers being in communication through a connection which is normally open but, when the valve means are operated in response to the input force, is closed to isolate the chamber from each other before the power chamber is pressurised whereby the boost piston acts on the output member through a volume of fluid trapped in the boost chamber.

Since the effective area of the boost piston is greater than that of the output piston, the output piston is moved through a distance correspondingly greater than a given distance through which the boost piston is moved when the pressure chamber is pressurised. Thus, by varying the relative areas of the boost piston and the output piston, the degree of travel of the output piston and the effective volume of the boost chamber which determines the boost ratio may be varied as required.

Conveniently the valve means comprises a valve spool working at least in part in a bore in the boost piston to control pressurisation of the power chamber.

When the booster is of the "closed-centre" type as defined above, after the chambers are isolated the valve spool is operative to place the power chamber in open communication with the inlet port so that hydraulic fluid is then admitted to the power chamber to pressurise it.

When the booster is of the "open-centre" type as defined above, after the chambers are isolated the valve spool is operative to cut-off communication between the power-chamber and the output port so that pressure from the inlet port can build up in the power chamber.

Preferably the input force is applied to the booster through an input piston working in an input bore which communicates at its inner end with a power chamber. By varying the relative areas of the input piston and the power piston, the magnitude of the input force and the travel of the input piston required to operate the booster may be varied as required.

Clearly, therefore, the boost ratio, input force, output force, and the travel of the input and output pistons can be determined simply by selecting the desired relative area of the three pistons.

In the event of failure of the source the input piston acts on the output piston through the valve spool.

Conveniently, one of the valve spool parts is incorporated in and is integral with the input piston.

When the booster is combined with an hydraulic master cylinder, an operating rod for the master cylinder projects into the housing of the booster and is engaged by the boost piston or by the output piston.

Conveniently the engagement takes place through a thrust assembly of which the effective length is adjustable to alter the relative axial positions to compensate for tolerance variations.

Some embodiments of our invention are illustrated in the accompanying drawings in which.

Figure 1:
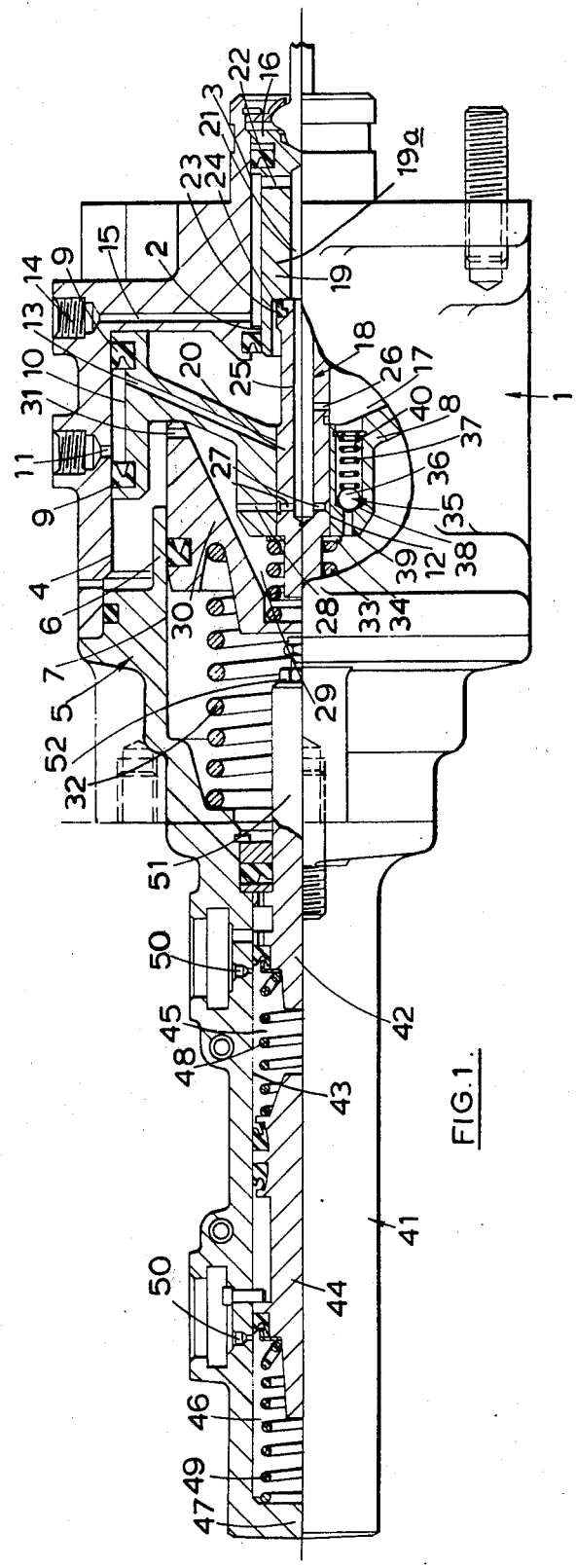
FIG. 1 is a longitudinal part-section of an assembly comprising an hydraulic booster of the "closed-centre" type combined with a tandem master cylinder, for a vehicle braking system.
Figure 2:
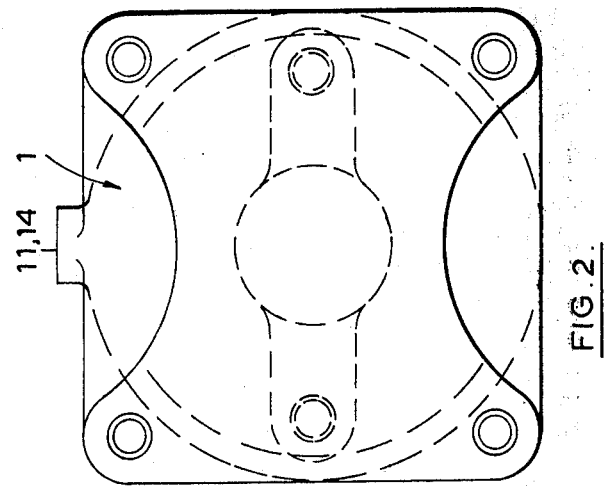
FIG. 2 is an elevation of one end of the assembly illustrated in FIG. 1.

In the combined booster and tandem master cylinder for an hydraulic braking system illustrated in FIGS. 1 and 2 of the drawings, the booster is of the "closed-centre" type and comprises a housing 1 provided with a longitudinal bore 2 which is counterbored in opposite directions at 3 and at 4 respectively. A hollow plug 5 inserted into the open end of the counterbore 4 includes an inwardly directed axially extending skirt 6 which is spaced from the counterbore 4 and of which the internal diameter defines a bore 7 continuous with the bore in the hollow plug 5.

A boost piston 8 working in the counterbore 4 includes axially spaced seals 9 at opposite ends of a land 10 of reduced diameter which communicates at all times with an inlet port 11 in the wall of the housing 1 for connection to a source of hydraulic fluid under pressure, conveniently an hydraulic accumulator. The boost piston 8 is provided with an axial through bore 12 which is connected to the land 10 by means of an inclined radial passage 13.

An outlet port 14 for connection to a reservoir for fluid communicates through a radial passage 15 in the housing 1 with the counterbore 3 in front of a pedal-operated input piston 16 which works in the counterbore 3.

Valve means are provided for controlling communication between the inlet port 11, the outlet port 14, and a power chamber 17 defined between the boost piston 8 and a shoulder at the change in diameter between the bore 2 and the counterbore 4. The valve means comprise a spool valve assembly generally indicated at 18. The spool valve assembly 18 is of two-part separable construction comprising a first spool part 19 and a second spool part 20. The spool part 19 comprises an extension 19a integral with and projecting forwardly from the input piston 16 and of a diameter chosen so that it is a working fit in the bore 2. The spool part 19 is provided with an axially extending blind bore 21 communicating at its outer end with the counterbore 3 through a radial passage 22. The inner end of the blind bore 21 is counterbored at 23 to define a recess which receives the adjacent end of the second spool part 20. The recess 23 is of a diameter greater than that of the end of the spool part 20 so that the spool parts 19 and 20 are relatively movable in a radial direction to compensate for tolerance variations. An annular face seal 24 carried by the second spool part 20 makes a sealing engagement with the base of the recess 23. The second spool part 20 is provided with a longitudinally extending blind bore 25 which communicates at its open end with the blind bore 21. A radial port 26 in the second spool part 20 provides communication between the blind bore 25 and the power chamber 17, and radial ports 27 provide communication between the blind bore 25 and the bore 12 in the boost piston 8 in which the second spool part 20 works. The radial ports 27 are spaced axially from the port 26 and, in the inoperative retracted position shown in the drawings, the ports 27 are aligned with a radial passage 28 in the boost piston 8 to provide communication between the bore 25 and a boost chamber 29 defined between the boost piston 8 and an output piston 30 working in the bore 7 and extending rearwardly into the housing for engagement with the boost piston 8 itself. Radial ports 31 are provided in the skirt of the piston 30 to provide communication between the opposite sides thereof. The output piston 30 is urged into a retracted position by means of a compression return spring 32 acting between the pistons 30 and the plug 5. A compression spring 33 also acts between the output piston 30 and a thrust washer 34 guided to slide on extension of reduced diameter at the inner end of the second spool part 20. In the retracted position the thrust washer engages with both the inner end of the boost piston 8 and a shoulder at the change in diameter at the inner end of the second spool part 20. In this position the passages 27 and 28 are aligned and the radial port 26 is spaced from the adjacent end of the boost piston 8 by an axial distance less than the distance between the ports 27 and the adjacent shoulder on the second spool part 20.

A one-way valve 35 is incorporated in the boost piston 8 to control communication between opposite sides of the boost piston 8 from the boost chamber 29 to the power chamber 17. As illustrated, the one-way valve comprises a valve member 36 which is normally urged by a spring 37 into engagement with a seating 38 at a change is diameter between a bore 39 and a counterbore 40 in which the valve member 36 and the spring 37 are located.

An hydraulic tandem master cylinder comprises a housing 41 which is clamped against the outer end of the plug 5. The tandem master cylinder is of known construction comprising a positively actuated piston 42 working in a longitudinally extending blind bore 43 in the housing 41. A second or floating piston 44 works in the bore 43 in advance of the piston 42. A primary pressure space 45 is defined in the bore 43 between the pistons, and a secondary pressure space 46 is defined in the bore 43 between the secondary piston and the closed end 47 of the bore 43. The pressure spaces 45 and 46 are connected to brake actuators through connections not shown and, in the inoperative position shown in the drawings, the pistons 42 and 44 are held in retracted positions by means of return springs 48 and 49. In this position each pressure space is in communication with a hydrostatic reservoir for fluid through a recuperation port 50 in the wall of the housing 41.

The positively actuated piston 42 is carried by a rearwardly extending operating rod 51 which extends into the booster through a central opening in the plug 5. The inner end of the rod carries a screw-threaded thrust assembly 52 of which the effective length is adjustable and which engages with the output piston 30. By adjusting the effective length of the thrust assembly 52 the relative axial positions of the parts of the combined booster and master cylinder assembly can be adjusted to compensate for tolerance variations.

In the inoperative retracted position shown in the drawings the boost chamber 29 and the power chamber 17 are in communication with each other through the one-way valve 35 and also communicate with the reservoir for fluid. Communication between the inlet port 11 and the power chamber 17 is cut-off by the land of the second spool part 20 closing the inner end of the radial passage 13.

When an input force is applied to the input piston 16 from a pedal the spool assembly 18 is moved inwardly. Initially, communication between the radial ports 27 and the ports 28 is cut-off and communication between the bore 25 and the power chamber 17 is cut-off in each case by a wall portion of the bore 12 closing the outer ends of the ports 27 26. Subsequent movement of the spool assembly 18 in the same direction opens the radial passage 13 as it registers with recess part 20a so that high pressure fluid is admitted to the power chamber 17. Since the fluid pressure augments the closing force of the spring 37 the power chamber 17 is pressurised and the boost piston 8 is therefore advanced in a counterbore 4. Since a volume of hydraulic fluid is trapped in the boost chamber 29 movement of the boost piston 8 is transmitted to the output piston 30. This in turn advances the piston 42 and 44 of the master cylinder to close the recuperation ports 50 and there after pressurise the hydraulic fluid in the pressure spaces 45 and 46. Since the area of the boost piston 8 is greater than that of the output piston 30, the output piston 30 is moved through a distance correspondingly greater than a given distance through which the boost piston 8 moves.

Upon failure of the high pressure source, and/or failure of the power chamber 17, the spool valve assembly 18 moves through the bore 12 to transmit directly to the output piston 30 an actuating force for operating the master cylinder. During this movement of the inner end of the first spool part 19 engages with the boost piston 8 and carries it forward. Since the boost piston 8 and the output piston 30 are of different areas, the fluid trapped in the boost chamber 29 will become pressurised. This pressure is relieved by the one-way valve 35 opening to exhaust the trapped fluid to the power chamber 17.

Figure 3:
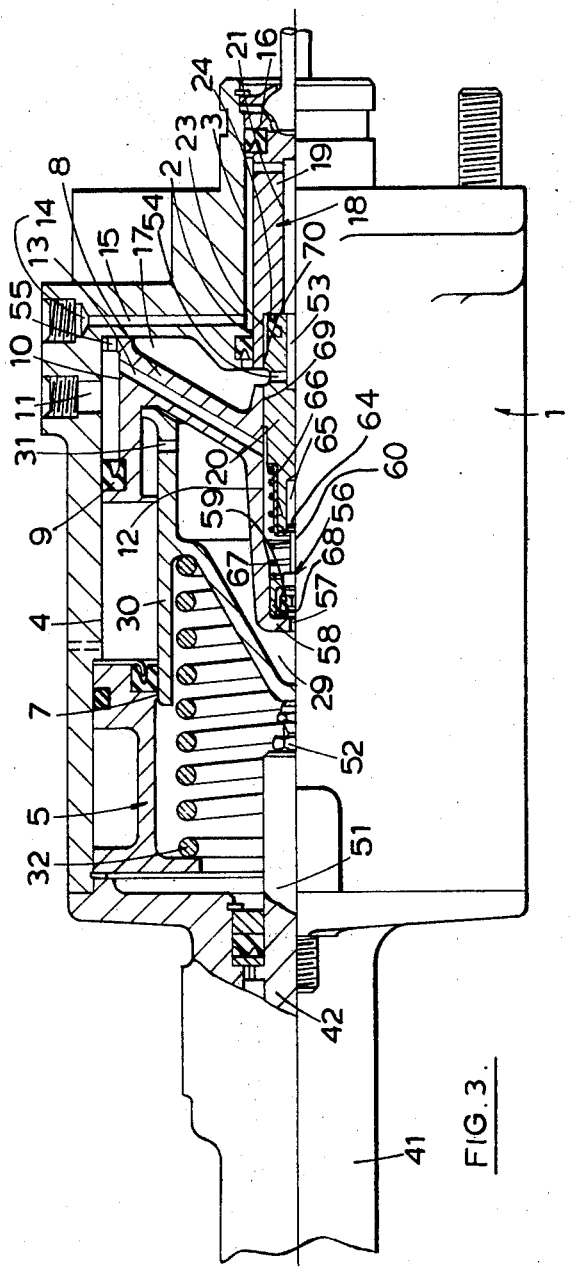
FIG. 3 is a section similar to FIG. 1 of an assembly including an hydraulic booster of the "open-centre" type.

In the booster illustrated in FIG. 3, which is a booster of the "open-centre" type the one-way valve 35, the radial passage 28, and the seal 9 adjacent to the shoulder between the counterbore 4 and the bore 2 are all omitted.

The second spool part 20 is provided with a longitudinally extending blind bore 53 which communicates at its open end with the blind bore 21. A radial port 54 in the second spool part 20 provides communication between the blind bore 53 and the power chamber 17 which, in turn, is in communication with the inlet port 11 through axial passages 55 in the boost piston 8.

An axially movable valve member 56 controls communication between the bore 12 and the boost chamber 29 through a port 57 surrounded by an inwardly directed radial flange 58 at the inner end of the bore 12. The axially movable valve member 56 comprises a head 59 for engagement with a seating surrounding the port 57 and comprising the flange 58. The head 59 is carried by a stem 60 having an enlarged head 64 which works in a blind bore 65 in an adjacent end of the spool part 20. The head 64 is retained in the bore 65 by means of an inturned flange at the outer end of a thimble 66 which receives the free end of the spool part 20 and has at its inner end an outwardly directed flange forming an abutment for one end of a compression spring 67 of which the opposite end acts on a shroud 68 in which the head 59 is guided.

In the inoperative position illustrated in the drawings the boost piston 8 is held in a retracted position in engagement with the housing 1 by means of a return spring 32 which acts on the boost piston 8 through the output piston 30. The head 59 is spaced from the seating so that fluid can be circulated continuously from the inlet port 11 to the outlet port 14, through the power and boost chamber 17 and 29, and through the communicating passages in the boost piston 8, the valve spool 18, and the housing 1.

When the input force is applied to the input piston 16 from a pedal the spool assembly 18 is moved inwardly. Initially, the head 59 engages with the seating to cut-off communication between the boost chamber 29 and the power chamber 17. Subsequent movement of the spool assembly 18 in the same direction causes lands 69 and 70 on the spool part 20 on opposite sides of the radial port 54 to engage with the wall of the bore 12 to close the passage 13 and the port 54 and isolate the power chamber 17. The power chamber 17 is thus pressurised by the hydraulic supply to advance the boost piston 8 in the counterbore 4.

Upon failure of the high pressure source and/or failure of the power chamber 17 the spool valve assembly 18 moves through the bores 2 and 12 until the inner end of the spool part 19 engages with the boost piston 8 to carry it forward.

During this movement the head 59 engages with the seating to isolate the chambers 17 and 29. Since the boost piston 8 and the output piston 30 are of different areas, the fluid trapped in the boost chamber 29 will become pressurised causing the output piston to move through a relatively greater distance than the boost piston 8.

In the event of leakage past the valve head 59 in this condition, the piston 8 engages the piston 30 acting on the master cylinder.

The construction and operation of the embodiment of FIG. 3 is otherwise the same as that of FIGS. 1 and 2 and corresponding reference numerals have been applied to corresponding parts.

Figure 4:
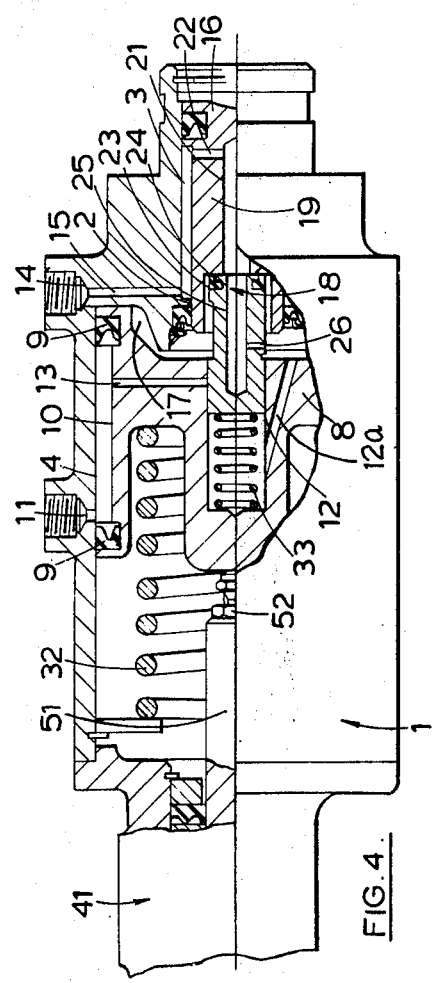
FIG. 4 is a longitudinal part-section through an assembly similar to FIG. 1 but incorporating a modified booster of the "closed-centre" type.
Figure 5:
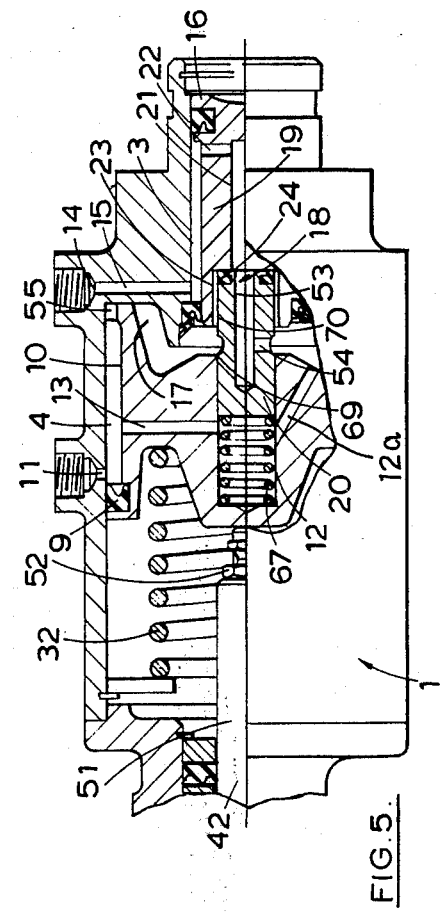
FIG. 5 is a section similar to FIG. 3 showing a modified booster of the "open-centre" type.

In both the embodiments of FIGS. 4 and 5, which are respectively modifications of the booster of FIGS. 1 and 2 and FIG. 3, and output pistons 30 have been omitted and the boost pistons 8 acts directly on the operating rods 51 of the master cylinders. Thus, in each construction, no boost chamber is provided and the chamber in the counterbore 4 of the side of the boost piston 8 remote from the power chamber is exhausted at all times to atmosphere through an exhaust passage not shown. In this construction the valve means 18 regulate only communication between the inlet port 11, the outlet port 14 and the power chamber 17 and the inner end of the bore 12 is closed with a drainage passage 12a connecting the closed end of the bore 12 to the power chamber 17.

The constructions and operations of the embodiments of FIGS. 4 and 5 are otherwise the same as those described above with reference to FIGS. 1 and 2, and FIG. 3, and corresponding reference numerals have been applied to corresponding parts.

We claim:
1. A power-operated hydraulic booster for a vehicle braking system comprising a housing having an inlet port for connection to a source of hydraulic fluid under pressure, an outlet port for connection to a reservoir for hydraulic fluid and a bore, a booster piston adapted to work in said bore and defining a power chamber in said bore, and valve means controlling communication between said ports and said power chamber, said valve means being so constructed and arranged that in response to an input force hydraulic fluid from said inlet port pressurises said power chamber to advance said boost piston in said housing thereby augmenting said input force, and said valve means comprises a spool working in complementary bores in said boost piston and an adjacent end of said housing, said spool comprising an assembly of at least two separate freely separable uncoupled spool parts having adjacent ends in abutment and provided with passage means which communicate at said adjacent ends, and sealing means are disposed between said adjacent ends to seal said passage means from said bores at least at said adjacent ends, one of said spool parts working in said bore in said boost piston and the other of said spool parts working in said bore in said housing.

2. An hydraulic booster as claimed in claim 1, wherein said end of said one spool part is received within a recess in said end of the said other spool part and said recess is of a diameter greater than that of the said one spool part, said sealing means comprising a seal provided between interengaging faces of the spool part ends.

3. An hydraulic booster as claimed in claim 2, wherein said seal comprises an annular seal located in said end of the said one spool part for engagement with said face which defines the base of said recess.

4. An hydraulic booster as claimed in claim 1, wherein said booster is of the "closed-centre" type in which said valve means normally cut-off communication between said power chamber and said inlet port and provide communication between said power chamber and said outlet port and, when said booster is operated in response to said input force, said valve spool is operated initially to cut-off communication between said power chamber and said outlet port and subsequently to place said power chamber in open communication with said inlet port so that hydraulic fluid under pressure is admitted to and pressurises said power chamber.

5. An hydraulic booster as claimed in claim 1, wherein said booster of the "open-centre" type in which hydraulic fluid is normally circulated continuously between said inlet and outlet ports through communicating passages in said boost piston and said valve spool and through said power chamber and, when said booster is operated, said valve spool is operative to cut-off communication between said power chamber and said outlet port so that pressure from said inlet port can build up in and pressurise said power chamber.

6. A power-operated hydraulic booster for a vehicle braking system comprising a housing having an inlet port for connection to a source of hydraulic fluid under pressure, and outlet port for connection to a reservoir for hydraulic fluid and a bore, a boost piston adapted to work in said bore and defining a power chamber in said bore, valve means controlling communication between said ports and said power chamber, said valve means being so constructed and arranged that in response to an input force hydraulic fluid from said inlet port pressurises said power chamber to advance said boost piston in said housing thereby augmenting said input force, an output piston adapted to work in said bore in a position in advance of said boost piston on the opposite side of said boost piston from said power chamber to define a boost chamber between boost piston and said output piston, said valve means also being so constructed and arranged to control communication between said power chamber and said boost chamber, and a connection between said chambers, said connection being normally open but, when said valve means are operated in response to said input force, is closed to isolate said chambers from each other before said power chamber is pressurised whereby said boost piston acts on said output member through a volume of fluid trapped in said boost chamber.

7. A power-operated hydraulic booster as claimed in claim 6, wherein said valve means comprises a valve spool working at least in part in a bore in said boost piston to control pressurisation of said power chamber.

8. A power-operated hydraulic booster as claimed in claim 7, wherein said valve spool controls communication between complementary passages in said boost piston and said housing.

9. A power-operated hydraulic booster as claimed in claim 7, wherein a spring-loaded axially movable valve member for engagement with a seating surrounding an opening between said bore in the boost piston and said boost chamber is coupled to the inner end of said valve spool for relative axial movement, the arrangement being such that said valve member is engageable with said seating to isolate the chambers before said valve spool permits said power chamber to be pressurised.

10. A power-operated hydraulic booster as claimed in claim 6, wherein the relative areas of said boost piston and said output piston can be varied to vary, as desired, the degree of travel of said output piston and the effective volume of said boost chamber.

11. A power-operated hydraulic booster as claimed in claim 6, incorporating an input piston working in an output bore in said housing which communicates at its inner end with said power chamber, whereby the relative areas of said input piston and said power-piston can be varied to vary, as desired, the magnitude of said input force and the travel of said input piston required to operate said booster.

12. A power-operated hydraulic booster as claimed in claim 11, wherein said valve means comprises a valve, spool of which at least a part is integral with said input piston.

13. In combination for a vehicle hydraulic braking system: a power-operated hydraulic booster and an hydraulic master cylinder wherein said booster comprises a housing having an inlet port for connection to a source of hydraulic fluid under pressure, an outlet port for connection to a reservoir for hydraulic fluid and a bore, a boost piston adapted to work in said bore and defining a power chamber in said bore, valve means controlling communication between said ports and said power chamber, said valve means being so constructed and arranged that in response to an input force hydraulic fluid from said inlet port pressurises said power chamber to advance said boost piston in said housing thereby augmenting said input force, and said valve means comprises a spool working in complementary bores in said boost piston and an adjacent end of said housing, said spool comprising an assembly of at least two separate spool parts which are in abutment at adjacent ends, and sealing means are disposed between said ends, one of said spool parts working in said bore in said boost piston and the other of said spool parts working in said bore in said housing, an output piston adapted to work in said bore in a position in advance of said boost piston on the opposite side of said boost piston from said power chamber to define a boost chamber between boost piston and said output piston, said valve means also being so constructed and arranged to control communication between said power chamber and said boost chamber, and a connection between said chamber, said connection being normally open but, when said valve means are operated in response to said input force, is closed to isolate said chambers from each other before said power chamber is pressurised whereby said boost piston acts on said output member through a volume of fluid trapped in said boost chamber, and wherein said master cylinder is provided with an operating rod which projects into said housing of said booster and is acted upon by said output piston.

14. The combination as claimed in claim 13, wherein said output piston acts on the operating rod through a thrust assembly of which the effective length is adjustable to compensate for axial tolerance variations.

* * * * *